June 24, 1930. H. F. WILMS 1,765,476
WATER MEASURING DEVICE FOR CONCRETE MIXERS
Filed April 19, 1928 2 Sheets-Sheet 1

Inventor
Henry F. Wilms
Kwis Hudson & Kent
attys

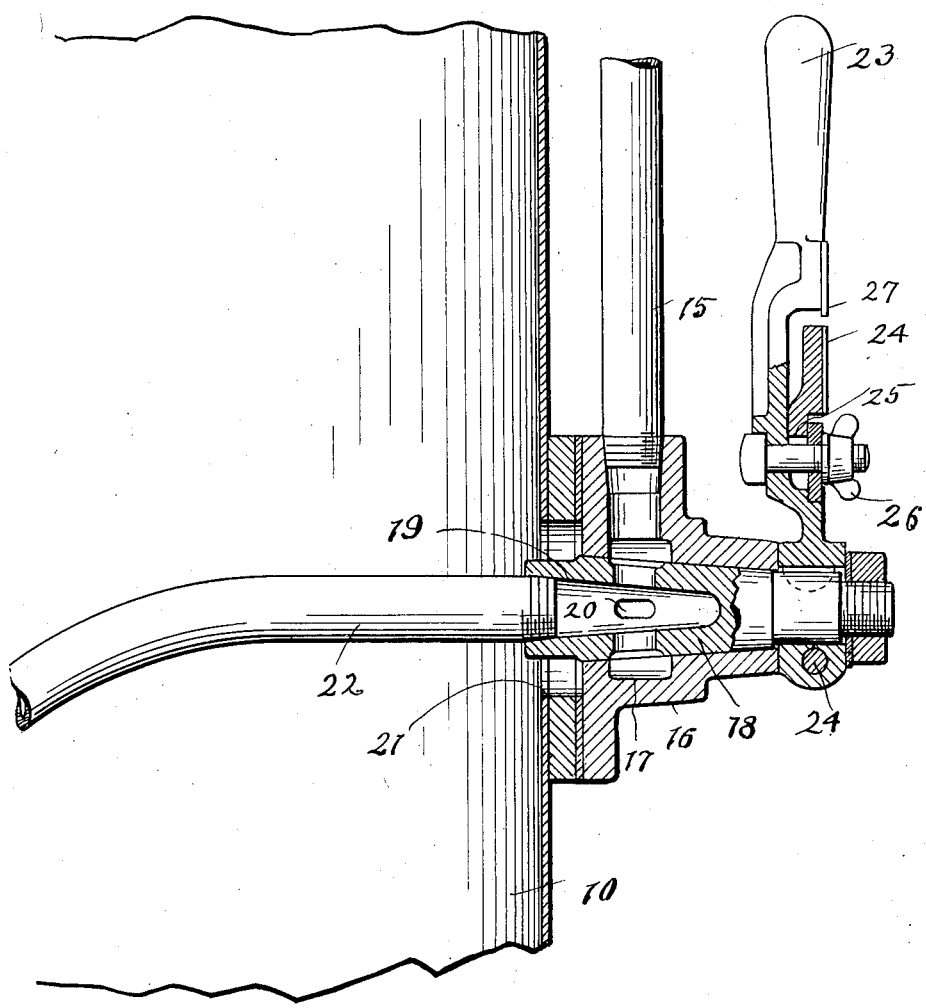

Patented June 24, 1930

1,765,476

UNITED STATES PATENT OFFICE

HENRY F. WILMS, OF CLEVELAND, OHIO, ASSIGNOR, BY MESNE ASSIGNMENTS, TO THE JAEGER MACHINE COMPANY, OF COLUMBUS, OHIO, A CORPORATION OF OHIO

WATER-MEASURING DEVICE FOR CONCRETE MIXERS

Application filed April 19, 1928. Serial No. 271,240.

This invention relates to a liquid dispensing apparatus and it has particular reference to that type in which the siphon principle is utilized for delivering liquid from a tank or other storage container.

The invention has for one of its objects the provision of an apparatus of the type referred to including novel means for breaking the siphon.

Another object is to provide means for accurately determining the quantity of liquid which will pass through the siphon before it is caused to break.

Other objects of the invention and the advantages to be derived through practice thereof will become apparent from the following detailed description of a preferred embodiment of the invention as applied to the water tank of a concrete mixing machine. It will be understood, however, that the invention is not limited to said use but is capable of a wide variety of applications without departing from the spirit thereof.

It has been discovered that the correct proportioning of the water in a concrete mixture bears a very distinct relation to the quality of the finished work and numerous means have been devised for ascertaining the proper quantity of water for a given quantity of other ingredients comprising a batch, together with various means for delivering the proper quantity. It is even customary to take into consideration the moisture content of the sand and other ingredients so that the exact proportion may be determined.

The present invention provides means for breaking the siphon at any desired level of the water in the tank and for determining, with great accuracy, the quantity of water passing through the siphon to the mixer and, therefore, constitutes an important advance in this art.

In the accompanying drawings, forming a part of this specification,

Fig. 3 is a vertical sectional view, partly broken away.

Figure 2:
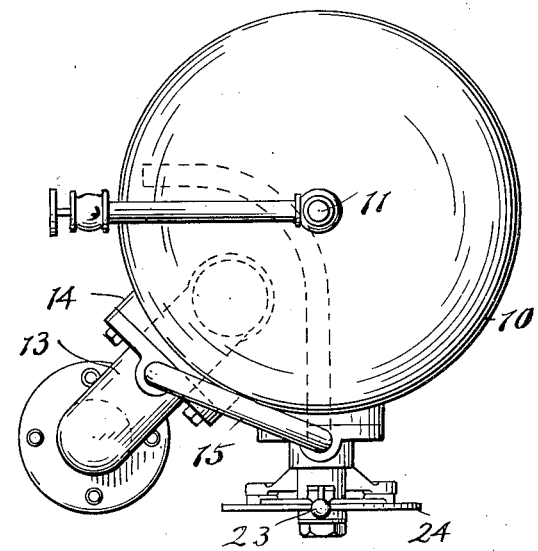
Fig. 2 is a plan view thereof.
Figure 1:
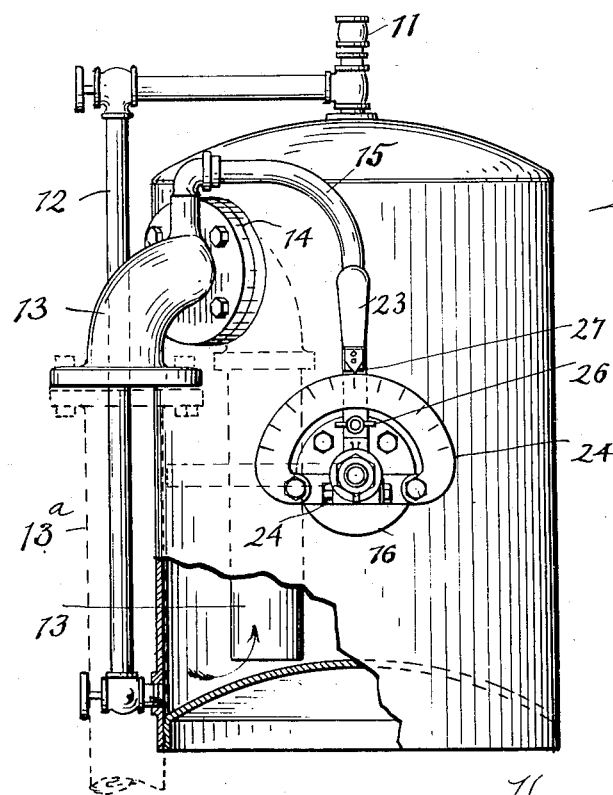
Fig. 1 is a side elevational view, partly in section, illustrating the invention as applied to the water tank of a concrete mixer.

The numeral 10 designates a sheet metal tank such as is in common use in connection with concrete mixing machinery, the tank being closed except for a vent pipe 11 which extends from the top thereof. A gauge glass 12 is mounted on the tank for indicating the level of the liquid contained therein.

It is desirable that as little time as possible be consumed in the filling and discharging of the contents of the tank and to this end there is provided a pipe 13 of large diameter through which the water enters and leaves the tank. The pipe 13 enters the tank at the side thereof adjacent the top and extends through the interior of the tank to a point adjacent its bottom. Suitable flanges 14 are provided on the tank and pipe at the point of entry.

As stated above, the water is caused to enter and leave the tank through the large pipe 13 and this is accomplished by means of a three-way valve, (not shown) located at a convenient point, which in one position connects the pipe 13 with the water supply and in its other position permits the water to flow from the tank through the pipe 13ª by the well-known siphon principle to the batch container of the machine, the tank being elevated with respect thereto.

The construction just described is more or less well known in the art and forms no part of the present invention which contemplates the provision of novel means for breaking the siphon at a predetermined level of the water within the tank and for indicating the quantity of water which will pass through the siphon prior to the breaking thereof.

The means for breaking the siphon includes a pipe 15 of relatively small diameter which communicates with the siphon 13 at a point adjacent the top of the bend therein and extends downwardly to a point midway of the height of the tank, at which point it is connected with a horizontally disposed housing 16 bolted or otherwise secured on the wall of the tank. The housing 16 is formed with a tapered bore which is cut away opposite the end of the pipe 15 to form an annular channel 17. A member 18 having its outer surface tapered to conform to the bore in the housing is secured for rotation therein. The member 18 is formed with an axial bore 19 for a portion of its length which is in communication with the annular channel 17 by means of apertures or ports 20. The open end of the member 18 communicates with the interior of the tank through an aperture 21 formed in the tank wall.

A pipe 22, similar in size to the pipe 15, is secured to the open end of member 18 and extends into the tank, a portion thereof being disposed radially with respect to the tubular member 18 extending to a point adjacent the wall of the tank so that as the member 18 is rotated the open end of the pipe will be raised or lowered within the tank according to the direction of rotation of the member 18.

The outer end of the member 18 projects beyond the end of the housing 16 and is adapted to receive a hand lever 23 which is clamped thereon by means of a bolt 24 or otherwise suitably secured, so that movement of the hand lever 23 will cause rotation of the member 18 and pipe 22.

It will be apparent that rotation of the member 18 will cause the open end of the pipe 22 to be raised or lowered within the tank according to the direction of movement of the hand lever. It will also be apparent that when the water falls below the level of the end of the pipe 22 air will be admitted into the pipe and will pass through the member 18 and pipe 15 to the top of the large siphon pipe 13 whereupon the vacuum in the large pipe will be broken and the flow of water will cease.

For determining the position of the hand lever 23 to permit a given quantity of water to pass through the siphon, prior to the breaking of the vacuum, there is mounted on the housing 16 a quadrant 24 which is graduated both in pounds and in gallons. The lower edge of the quadrant is formed with a shoulder 25 that is engaged by a clamping nut 26 carried by the hand lever 23. The hand lever also carries a pointer 27 which cooperates with the graduations on the quadrant 24.

The operation of the device is as follows:

Assuming the tank 10 to have been filled with water by manipulation of the three-way valve and the quantity of water required for a certain concrete batch to be known, the hand lever 23 is moved to adjust the end of the small pipe 22 at the proper level for such quantity as indicated on the quadrant 24, the clamping nut 26 is then tightened and the three-way valve moved to its discharge position. The water in the large pipe 13 will now begin to flow and will cause water to be siphoned from the tank, due to its elevated position, until the water passes the level of the end of pipe 22 whereupon air will enter the pipe and will pass to the top of the siphon pipe 13 breaking the vacuum therein and causing the flow of water to cease, the water in the portion of the pipe 13 within the tank draining back into the tank to the level of the water therein. The subsequent filling of the tank will submerge the end of the curved pipe 22, thereby causing the water to be retained in the siphon 13 so that the operation may be repeated.

While I have described the invention as applied to a water tank for use in connection with a concrete mixer, it will be apparent that it is not limited to such use but is capable of application wherever a siphon may be employed. I, therefore, desire that only such limitations be imposed as are set forth in the appended claims.

Having thus described my invention, I claim:

1. A device adapted to be used with a liquid dispensing apparatus including a tank which has associated therewith a siphon provided with a leg communicating with a lower portion of the tank, said device comprising a housing adapted to be secured to the exterior of the tank and having a tapered bore and an annular chamber, a pipe associated with said housing and communicating at one end with the bore therein and at its other end with the siphon, a rotatable member in said tapered bore of said housing, a second pipe associated with said rotatable member and having a radially disposed portion extending into the liquid holding portion of said tank, a lever associated with said rotatable member, and means for effecting communication between said pipes.

2. A device adapted to be used with a liquid dispensing apparatus including a tank having associated therewith a siphon which is provided with a leg communicating with a lower portion of the tank, said device comprising a housing adapted to be secured to the exterior of the tank and having a tapered bore and an annular chamber surrounding said bore, a pipe associated with said housing and communicating at one end with the annular chamber and at its other end with the siphon, a tapered rotatable member arranged in said tapered bore of said housing and having a bore extending for a portion of its length and radially disposed openings communicating with said bore and with the annular chamber in said housing, a second pipe associated with said rotatable member and in communication with the bore therein, said second named pipe having a radially disposed portion extending into the liquid holding portion of said tank, a lever associated with the outer end of said rotatable member for rotating the same, and means for securing said lever in various positions of adjustment.

In testimony whereof, I hereunto affix my signature.

HENRY F. WILMS.